(12) United States Patent
Walters et al.

(10) Patent No.: US 10,872,119 B1
(45) Date of Patent: Dec. 22, 2020

(54) TECHNIQUES FOR INTERACTION-BASED OPTIMIZATION OF A SERVICE PLATFORM USER INTERFACE

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/726,658

(22) Filed: Dec. 24, 2019

(51) Int. Cl.
| | | |
|---|---|---|
| *G06F 16/00* | (2019.01) | |
| *G06F 16/903* | (2019.01) | |
| *G06F 17/18* | (2006.01) | |
| *G06F 16/906* | (2019.01) | |

(52) U.S. Cl.
CPC ...... *G06F 16/90335* (2019.01); *G06F 16/906* (2019.01); *G06F 17/18* (2013.01)

(58) Field of Classification Search
CPC ....................................................... G06F 16/00
See application file for complete search history.

(56) References Cited

U.S. PATENT DOCUMENTS

| | | | |
|---|---|---|---|
| 5,644,723 A | 7/1997 | Deaton et al. | |
| 6,490,601 B1 | 12/2002 | Markus et al. | |
| 7,413,113 B1 | 8/2008 | Zhu | |
| 8,732,662 B1 | 5/2014 | Savant | |
| 2006/0004763 A1 | 1/2006 | Horvitz et al. | |
| 2007/0288641 A1 | 12/2007 | Lee et al. | |
| 2008/0078831 A1 | 4/2008 | Johnson et al. | |
| 2009/0198507 A1 | 8/2009 | Rhodus | |
| 2011/0076663 A1* | 3/2011 | Krallman | G09B 7/00 434/362 |
| 2012/0095834 A1 | 4/2012 | Doig et al. | |
| 2012/0130934 A1* | 5/2012 | Brillhart | G06Q 30/0203 706/46 |
| 2015/0012814 A1 | 1/2015 | Roy et al. | |
| 2015/0324811 A1* | 11/2015 | Courtright | G06Q 30/02 705/7.32 |
| 2015/0356573 A1* | 12/2015 | Zadrozny | G06Q 30/0201 705/7.32 |

* cited by examiner

*Primary Examiner* — Khanh B Pham
(74) *Attorney, Agent, or Firm* — Kacvinsky Daisak Bluni PLLC (57) ABSTRACT

Techniques and apparatus for an interactive element presentation process are described. In one embodiment, for example, an apparatus may include a storage device and logic, at least a portion of the logic implemented in circuitry coupled to the storage device. The logic may operate to determine a plurality of user clusters, determine a plurality of queries to prompt for user information, assign each of the plurality of queries: a plurality of priority values and a plurality of response probability, present a set of user queries for presentation to a user interacting with the computer-implemented interface based on the plurality of priority values and the plurality of response probability values for the one of the plurality of user clusters associated the user, receive interaction information associated with user interaction with the computer-implemented platform, and modify the set of user queries based on the interaction information. Other embodiments are described.

19 Claims, 7 Drawing Sheets

```
┌─────────────────────────────────┐
│ Determine User Information for Users │
│ Interacting with a Service Platform  │
│              402                 │
└─────────────────────────────────┘
                │
                ▼
┌─────────────────────────────────┐
│ Determine Interaction Information Users │
│ Interacting with Interaction Elements of the │
│        Service Platform          │
│              404                 │
└─────────────────────────────────┘
                │
                ▼
┌─────────────────────────────────┐
│ Generate Clusters Based on the User │
│  Information and/or the Interaction │
│           Information            │
│              406                 │
└─────────────────────────────────┘
```

TECHNIQUES FOR INTERACTION-BASED OPTIMIZATION OF A SERVICE PLATFORM USER INTERFACE

TECHNICAL FIELD

Embodiments herein generally relate to managing a network-based service platform and, more particularly, for determining interactive elements of the service platform to be presented to a user based on the interaction of groups or clusters of users with the service platform.

BACKGROUND

A main engagement interface of service providers, such as credit card companies and other consumer financial service providers, is via a company website. For example, new users may use the company website to set up a new account, request new services, update information, purchase products and services, and/or the like. A goal of service providers is to present information for users to interact with the website and get the user to an end page to finalize a transaction (e.g., make a purchase, apply for a credit card, and/or the like). However, there is a balance between obtaining sufficient information for the service provider to complete the transaction and prevent fraud, while not losing customer interest or making the process too burdensome. Conventional service provider platforms are static and employ a one-size-fits-all functionality that does not provide a positive user experience and may actually deter certain users from getting to the end page and completing the transaction.

SUMMARY

This Summary is provided to introduce a selection of concepts in a simplified form that is further described below in the Detailed Description. This Summary is not intended to necessarily identify key features or essential features of the claimed subject matter, nor is it intended as an aid in determining the scope of the claimed subject matter.

In accordance with various aspects of the described embodiments is an apparatus that may include a storage device and logic, at least a portion of the logic implemented in circuitry coupled to the storage device. The logic may operate to determine a plurality of user clusters to categorize a plurality of users based on an interaction level with a computer-implemented platform, determine a plurality of queries to prompt for user information from the plurality of users, assign each of the plurality of queries: a plurality of priority values, each of the plurality of priority values indicating a priority of a query for one of the plurality of user clusters, and a plurality of response probability values, each of the plurality of response probability values comprising a second value associated with a response probability for the query for the one of the plurality of user clusters, present a set of user queries selected from the plurality of queries for presentation to one of the plurality of users interacting with the computer-implemented interface based on the plurality of priority values and the plurality of response probability values for the one of the plurality of user clusters associated with the one of the plurality of users, receive interaction information associated with user interaction with the computer-implemented platform during presentation of the set of user queries, and modify the set of user queries based on the interaction information.

In some embodiments of the apparatus, the logic may modify a number of queries in the set of user queries. In various embodiments of the apparatus, the interaction information may include a speed of answering at least a portion of the set of user queries. In exemplary embodiments of the apparatus, the logic may modify the set of user queries by dynamically removing at least one unanswered query responsive to the interaction information indicating decreased engagement with the computer-implemented platform. In some embodiments of the apparatus, the logic may remove the at least one unanswered query with a lowest priority value. In various embodiments of the apparatus, the logic may modify the set of user queries by dynamically adding at least one query responsive to the interaction information indicating increased engagement with the computer-implemented platform. In some embodiments of the apparatus, the logic may add the at least one query with a highest priority value of remaining queries of the plurality of queries. In various embodiments of the apparatus, the logic may generate the plurality of user clusters based on user profile information and query interaction information, the query interaction information indicating queries of the set of user queries answered by the one of the plurality of users. In some embodiments of the apparatus, the logic may determine the set of user queries to include a maximum number of queries expected to be answered by the one of the plurality of users.

In accordance with various aspects of the described embodiments is a computer-implemented method. The method may include, via a processor of a computing device, determining a plurality of user clusters to categorize a plurality of users based on an interaction level with a computer-implemented platform; determining a plurality of queries to prompt for user information from the plurality of users; assigning each of the plurality of queries: a plurality of priority values, each of the plurality of priority values indicating a priority of a query for one of the plurality of user clusters, and a plurality of response probability values, each of the plurality of response probability values comprising a second value associated with a response probability for the query for the one of the plurality of user clusters; presenting a set of user queries selected from the plurality of queries for presentation to one of the plurality of users interacting with the computer-implemented interface based on the plurality of priority values and the plurality of response probability values for the one of the plurality of user clusters associated with the one of the plurality of users; receiving interaction information associated with user interaction with the computer-implemented platform during presentation of the set of user queries; and modifying the set of user queries based on the interaction information.

In some embodiments, the method may include modifying a number of queries in the set of user queries. In various embodiments of the method, the interaction information may include a speed of answering at least a portion of the set of user queries. In exemplary embodiments, the method may include modifying the set of user queries by dynamically removing at least one unanswered query responsive to the interaction information indicating decreased engagement with the computer-implemented platform. In some embodiments, the method may include removing the at least one unanswered query with a lowest priority value. In various embodiments, the method may include modifying the set of user queries by dynamically adding at least one query responsive to the interaction information indicating increased engagement with the computer-implemented platform. In some embodiments, the method may include adding the at least one query responsive with a highest priority value of remaining queries of the plurality of queries. In various embodiments, the method may include generating the plurality of user clusters based on user profile information and query interaction information, the query interaction information indicating queries of the set of user queries answered by the one of the plurality of users. In some embodiments, the method may include determining the set of user queries to include a maximum number of queries expected to be answered by the one of the plurality of users.

In accordance with various aspects of the described embodiments is at least one non-transitory computer-readable medium comprising a set of instructions that, in response to being executed via a processing unit of a computing device, cause the computing device to: determine a plurality of user clusters to categorize a plurality of users based on an interaction level with a computer-implemented platform; determine a plurality of queries to prompt for user information from the plurality of users; assign each of the plurality of queries: a plurality of priority values, each of the plurality of priority values indicating a priority of a query for one of the plurality of user clusters, and a plurality of response probability values, each of the plurality of response probability values comprising a second value associated with a response probability for the query for the one of the plurality of user clusters; present a set of user queries selected from the plurality of queries for presentation to one of the plurality of users interacting with the computer-implemented interface based on the plurality of priority values and the plurality of response probability values for the one of the plurality of user clusters associated with the one of the plurality of users; receive interaction information associated with user interaction with the computer-implemented platform during presentation of the set of user queries; and modify the set of user queries based on the interaction information.

In some embodiments of the at least one non-transitory computer-readable medium, the set of instructions, in response to being executed via the processing unit of the computing device, cause the computing device to: modify the set of user queries by: dynamically removing at least one unanswered query responsive to the interaction information indicating decreased engagement with the computer-implemented platform, and dynamically adding at least one query responsive to the interaction information indicating increased engagement with the computer-implemented platform.

DETAILED DESCRIPTION

Various embodiments may generally be directed toward systems, methods, and/or apparatus for interaction-based presentation of interactive elements on a computer-implemented interface, such as a services platform. In some embodiments, the services platform may be a website, application interface, and/or the like for users to interact with a service provider, such as a retailer, merchant, financial services provider, credit card company, government entity, and/or the like. Users of the services platform may be categorized into one or more clusters based on various characteristics, such as user characteristics (for instance, information associated with a particular user) and/or interaction characteristics (for instance, how a population of users interacts with the services platform).

Interactive elements in the form of graphical user interface (GUI) objects may be presented via the services platform. For example, an interactive element may include a question or query for information from a user. In some embodiments, a service, such as a transaction, may be associated with a plurality of interactive elements that may be associated with completing the transaction (for instance, setting up a user account, applying for a credit card, purchasing a product, and/or the like). In various embodiments, a set of interactive elements may be selected for presentation to a user interacting with the services platform based on a cluster associated with the user. As the user interacts with the services platform and interactive elements, interaction information (for instance, user behavior measurements, an "audit trail," and/or the like) may be generated. The set of selected interactive elements may be automatically and dynamically modified based on the interaction information as the user interacts with the services platform.

Utilizing the measurements, forms may be optimized in an automated, programmatic process (for instance, utilizing AB testing) to, for instance, reorder fields or sections, removing unnecessary fields, pre-filling (for instance, via location data, historical data, and/or the like), obtaining data throughout the transaction (for instance, shopping) experience, providing engaging images (for instance, of products or services), and/or the like. For example, cluster behavior may be monitored from transaction to transaction to determine a pattern or model of behavior for a cluster, for example, utilizing outlier detection (such as Z-score) to determine if someone or a cluster of people are more enthusiastic than others. An advantage of using clusters according to some embodiments is to get a user to provide the requisite information to get to the end page and complete the transaction. However, if it's not engaging, it is easy for the user to forget or think of a reason to disengage (for instance, budget concerns). Accordingly, some embodiments may user clusters to make the transaction process as engaging as possible to increase a probability that a user completes the transaction.

Accordingly, some embodiments may provide multiple technological advantages over prior art systems. In addition, various embodiments may provide improvements in computing technology and technological features, for instance, by providing dynamic interactive element presentation processes associated with a service provider. Such embodiments may improve, inter alia, the efficiency of computing systems managing service platforms and associated user accounts, services, transaction, and/or related articles. One non-limiting example of a technological advantage may include providing an improved user experience for users attempting to perform a transaction or otherwise interact with a services platform by providing interactive elements optimized for the cluster associated with the user. Another non-limiting example of a technological advantage may include providing a services platform where more transactions are completed compared with conventional systems due to reduced user drop-off due to irrelevant and/or unwanted interactive elements. Other technological advantages are provided by the described embodiments.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Figure 1:
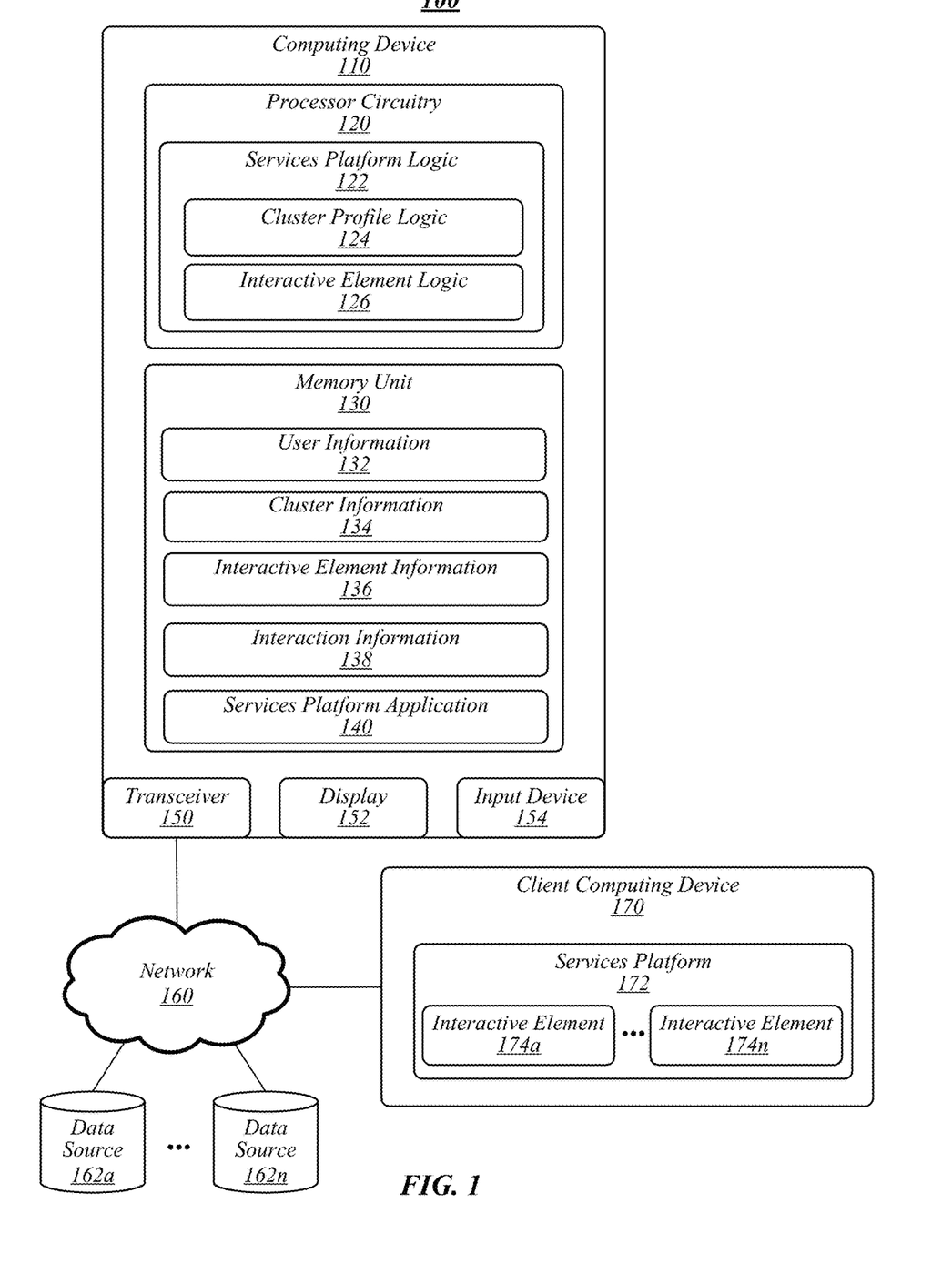
FIG. 1 illustrates an embodiment of a first operating environment.

FIG. 1 illustrates an example of an operating environment 100 that may be representative of some embodiments. As shown in FIG. 1, operating environment 100 may include computing device 110 communicatively coupled to (client) computing device 170, for example, via network 160. In some embodiments, computing device 110 and/or computing device 170 may be or may include a stand-alone computing device, such as a personal computer (PC), server, tablet computing device, cloud computing device, mobile computing device (for instance, a smart phone, tablet computing device, and/or the like), data appliance, and/or the like. In some embodiments, computing device 110 may include a plurality of computing devices and/or computing systems (for instance, data centers, cloud computing environments, computing clusters, and/or the like). In various embodiments, computing device 110 may be associated with a service provider for providing services to customers. In exemplary embodiments, computing device 170 may be a customer computing device (for instance, smartphones, tablet computing devices, laptops, and/or the like) for accessing services provided via computing device 110.

Although only one computing device 110 and one computing device 170 is depicted in FIG. 1, embodiments are not so limited. In various embodiments, the functions, operations, configurations, data storage functions, applications, logic, and/or the like described with respect to computing device 110 and/or computing device 170 may be performed by and/or stored in one or more other computing devices. A single computing device 110 and a single computing device 170 is depicted for illustrative purposes only to simplify the figure.

As shown in FIG. 1, computing device 110 may include processor circuitry 120, a memory unit 130, a transceiver 150, a display 152 and an input device 154. Processor circuitry 120 may be communicatively coupled to memory unit 130 and/or transceiver 140.

Processor circuitry 120 may include and/or may access various logic for performing processes according to some embodiments. For instance, processor circuitry 120 may include and/or may access services platform logic 122, cluster profile logic 124, and/or interactive element logic 126. Processing circuitry 120 and/or services platform logic 122, cluster profile logic 124, and/or interactive element logic 126, and/or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although services logic 122 is depicted in FIG. 1 as being within processor circuitry 120, embodiments are not so limited. In addition, although cluster profile logic 124 and interactive element logic 126 are depicted as being a logic of services platform logic 122, embodiments are not so limited, as cluster profile logic 124 and interactive element logic 126 may be separate logics and/or may not be standalone logics but, rather, a part of services platform logic 122. For example, services platform logic 122, and/or any component thereof, may be located within an accelerator, a processor core, an interface, an individual processor die, implemented entirely as a software application (for instance, services platform application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store a services platform application 140 that may operate, alone or in combination with services platform logic 122, to perform various functions according to some embodiments. For example, services platform application 140 may be or may include an application operative to implement functionality of services platform logic 122, cluster profile logic 124, and/or interactive element logic 126. In various embodiments, services platform logic 122 may operate to provide various services of a service provider associated with computing device 110 and/or a service platform managed by computing device. Non-limiting examples of service providers may include financial service providers (for instance, banking services, credit card services, financial advice services, brokerage services, and/or the like), entertainment service providers (for instance, Netflix®, Amazon Prime® Video, Comcast®, Verizon®, and/or the like), gaming services, gambling/betting services, music streaming services, cloud computing or hosting service providers (for example, Amazon Web Services®), internet service providers, utility service providers, medical or healthcare service providers, education service providers, vehicle services (for instance, vehicle subscription services), and/or the like. Embodiments are not limited in this context.

In various embodiments, services platform logic 122 may operate to provide services associated with a service provider. For example, for a credit card services provider, services platform logic 122 may be operative to process credit card transactions and/or provide an application for users to access credit card accounts and associated functions. In another example, for an education services provider, services platform logic 122 may be operative to provide access to education resources, such as digital libraries, course videos, and/or the like. Embodiments are not limited in this context.

In various embodiments, services platform logic 122 may operate to provide user accounts for users of services provided by the service provider. For example, service provider may provide credit card services and services platform logic 122 may implement an enterprise platform for credit card users to set up user accounts to manage various aspects of their credit card, such as viewing account information, submitting payments, viewing transaction history, completing transactions, setting up new services, applying for new credit cards, and/or the like. In some embodiments, the enterprise platform may be or may include a web-based platform that may be accessed remotely by users (for instance, via services platform 172 of computing device 170). In another example, service provider may be a healthcare provider and the enterprise platform implemented via services platform logic 122 may provide patient access to their healthcare information, schedule medical appointments, request healthcare services, access prescriptions, and/or the like. Embodiments are not limited in this context.

In some embodiments, services platform logic 122 may create user accounts and store information associated with the user accounts as user information 132. In various embodiments, services platform logic 122 may manage user account authentication (for instance, login services, data encryption/decryption, and/or the like) for user accounts. Although FIG. 1 depicts information, such as user information 132, cluster information 134, interactive element information 136, interaction information 138, and/or the like stored within computing device in memory unit 130, embodiments are not so limited. For example, information may be stored in data stores, databases, and/or the like outside of computing device 110, such as data source 162a-n.

Services platform logic 122, for example, via services platform application 140, may operate to provide or otherwise manage a services platform, such as a website, client application, internet browser application and/or module, mobile application ("mobile app" or "app") accessible by users via services platform 172 of client computing device 170. In some embodiments, services platform logic 122 may operate to perform an interactive element presentation process according to various embodiments.

Figure 2:
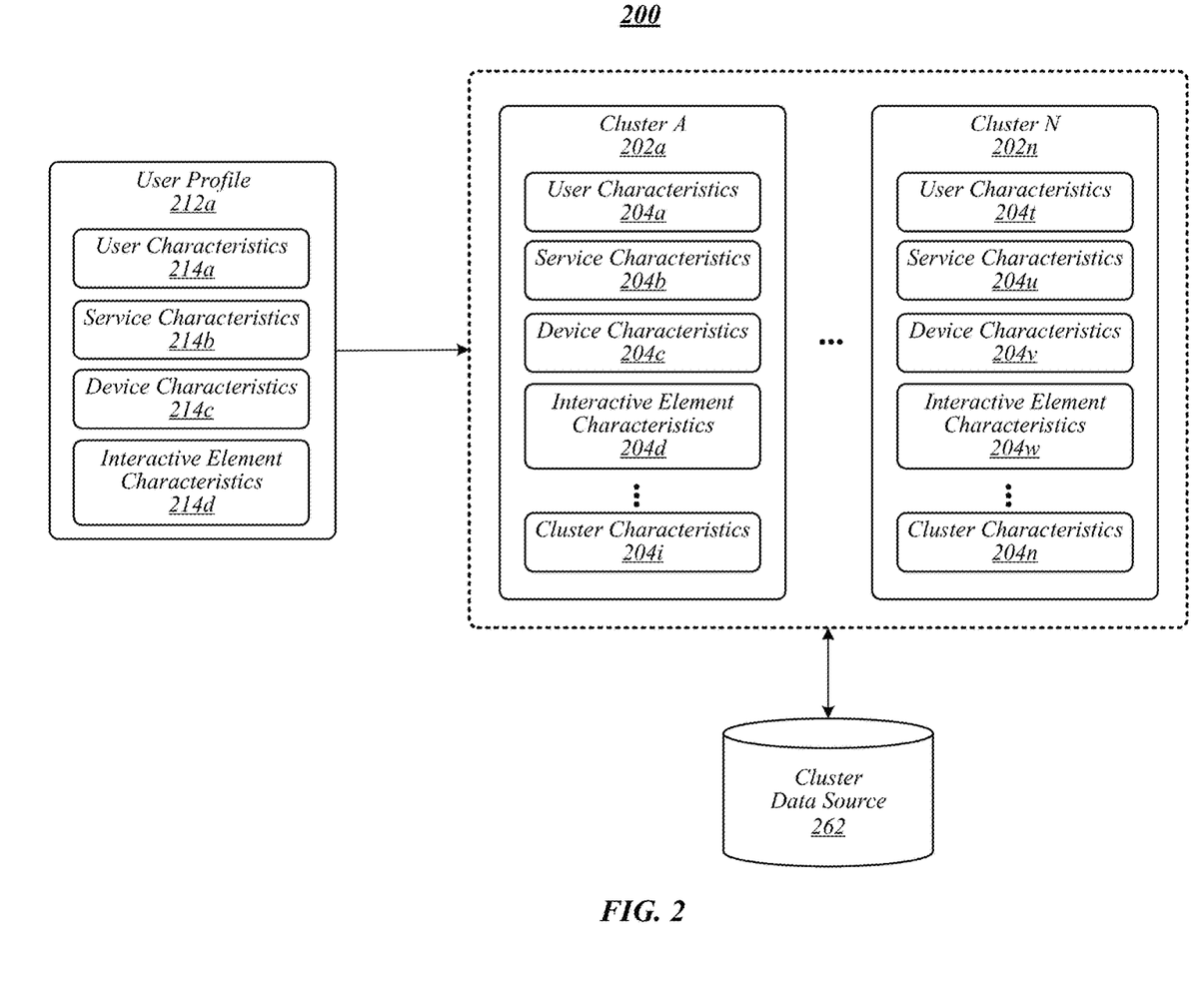
FIG. 2 illustrates an embodiment of a second operating environment.

In some embodiments, services platform logic 122 may operate to register users with the services platform. User information 132 may include information about registered users, for example, stored in a user profile or other record. FIG. 2 illustrates an example of an operating environment 200 that may be representative of some embodiments. As shown in FIG. 2, a user may be associated with a user profile 212a associated with a plurality of properties 214a-n. Non-limiting examples of user information 132 may include user characteristics 214a in the form of personal information (for instance, name, address, phone number, social security number, and/or the like), service characteristics 214b (for instance, services associated with the user, frequency of use of services, and/or the like), device characteristics 214c (for instance, type of device being used by user, such as a smartphone, PC, and/or the like), and/or the like. In some embodiments, user profile 212a may include interactive element characteristics 214d that may include historical interaction information indicating user behavior with services platform 172 and/or interactive elements 174a-n. For example, services platform logic 122 may maintain a record of the interactive behavior of a user with services platform, such as engagement behavior information, browsing history, and/or the like.

In general, engagement behavior information may indicate a level of engagement of a user with services platform 172, such as an amount of time spent on services platform, time information (for instance, time between interactive element selections), whether user has completed transactions, whether user has disengaged from a transaction and, if so, the associated interactive elements, mouse movements, clicks, field/element selections, typing rates, eye movements, and/or the like. In some embodiments, engagement behavior information may be or may include an "audit trail" of user interactions with services platform 172. The audit trail may include records of user activity with services platform 172, such as date-time stamps, interactive element selections, initiated transactions, accessed pages/forms, time between selections, and/or the like. For example, engagement behavior information may indicate that User A initiated a transaction (for instance, applying for a credit card that initiated a credit card form object or page) at time X and answered Query A at time X+t and Query B at time X+u, then disengaged from the transaction when prompted from Query C (for example, by closing the app on their mobile device or due to a time out following a lack of response). Embodiments are not limited in this context.

In some embodiments, cluster profile logic 124 may operate to group users into clusters stored in cluster information 134. Referring to FIG. 2, in general, a cluster 214a-n may include a set of users grouped according to one or more cluster characteristics 204a-n. In some embodiments, cluster profile logic 124 may operate to track user and/or cluster behavior for storage as cluster information 134, for instance, in a cluster data source 262.

In some embodiments, a user may be grouped into a plurality of clusters. In various embodiments, clusters may be configured to model user behavior with the services platform. In one non-limiting example, a cluster may include a "mobile device cluster" for users that access services platform via a mobile device. In other non-limiting examples, clusters may be based on age, gender, geographic location, education level, income level, platform services (for instance, which services are associated with the users), rate of engagement (how often does user visit the services platform, how long does the user spend on the services platform, and/or the like), transactions/interactions with services platform (for instance, which activities does the user perform when the user visits the services platform, such as checking an account balance, purchasing a product, and/or the like), credit score, age of account, type of device, combinations thereof, and/or the like. For instance, a cluster may be determined for a banking application of users aged 25-35 that access the banking application via a smartphone. Embodiments are not limited in this context.

In some embodiments, a cluster may be associated with context information indicating a context of interaction, such as engagement level, time of day, duration between visits, and/or the like. For example, Cluster A may be based on user age, but may have a context of high engagement, low engagement, and/or the like. In some embodiments, services platform logic 122 may determine an engagement score to indicate an engagement context. In this manner, each cluster may be determined based on user characteristics, but may be modified based on context information (for instance, Cluster A when using a smartphone versus Cluster A when using a PC, Cluster B with high engagement (over an engagement score threshold) versus Cluster B with low engagement (below an engagement score threshold), and/or the like).

Referring to FIG. 1, services platform 172 may present interactive elements 174a-n to user. In general, interactive elements may include GUI objects that may be used to present information, receive information, make selections (for instance, a "continue" button), and/or the like. In some embodiments, interactive elements 174a-n may include questions or queries to a user, for example, performing a transaction, to obtain information from the user. In some embodiments, interactive element information 136 may include a listing or database of available interactive elements 174a-n available for display via services platform 172. In various embodiments, certain interactive elements 174a-n may be associated with a particular transaction, such as opening a new account, making a purchase, and/or the like. In some embodiments, interactive element logic 126 may operate to assign a priority to interactive elements 174a-n indicating a precedence of interactive element 174a-n, for example, indicating an order of importance for displaying interactive element 174a-n during a transaction process. In some embodiments, the interactive elements 174a-n may be associated with a matrix of priorities based on various configurations of interactive elements 174a-n and/or user interaction therewith. For instance, Query A may have a high priority (for instance, 8 on a scale of 10), but a lower priority (for instance, 5) if the user has answered Query B. In another example, Query C may have a priority of 8 out of 10 for users having a FICO® credit score below 700 and a priority of 5 out of 10 for users having a credit score above 750.

In some embodiments, interactive element logic 126 may operate to assign a response probability to interactive elements 174a-n indicating a probability that a user associated with a cluster may interact with (for instance, provide requested information) interactive element 174a-n. In some embodiments, the response probability may be based on historical user engagement information. In various embodiments, the response probability. For example, users of Cluster A have a 80% probability of answering Query A and a 50% probability of answering Query B (which may be 20% if Query B follows Query A).

In various embodiments, the priority and/or response probability may be specific to a cluster. For example, Query A may have a priority of 8 out of 10 for a "users aged 25-35" cluster, but a priority of 5 out of 10 for a "users aged 45-55" cluster. For instance, the probability of fraud may decrease with age, such that Query A (soliciting more information for a transaction) may have a lower priority for older users. In another example, Query B may have a response probability of 80% for a "PC users" cluster, but a response probability of 20% for a "smartphone users" cluster. Accordingly, mobile device users may be less likely to answer Query B. Embodiments are not limited in this context.

In various embodiments, when a user interacts with services platform 172, interaction information 138 may be generated. In general, interaction information 138 may include a record of events of user engagement with interactive elements 174a-n. Non-limiting examples of interaction information 138 may include interactive element selection (for instance, a button GUI object), data entry (for instance, for a text box GUI object), correct data entry (for instance, whether the user entered complete, correct information), timing information (for instance, how long after displaying an interactive element did user engage with the interactive element), and/or the like. In some embodiments, interaction information 138 may include testing information, such as AB testing, Z-score information, and/or the like.

Figure 3:
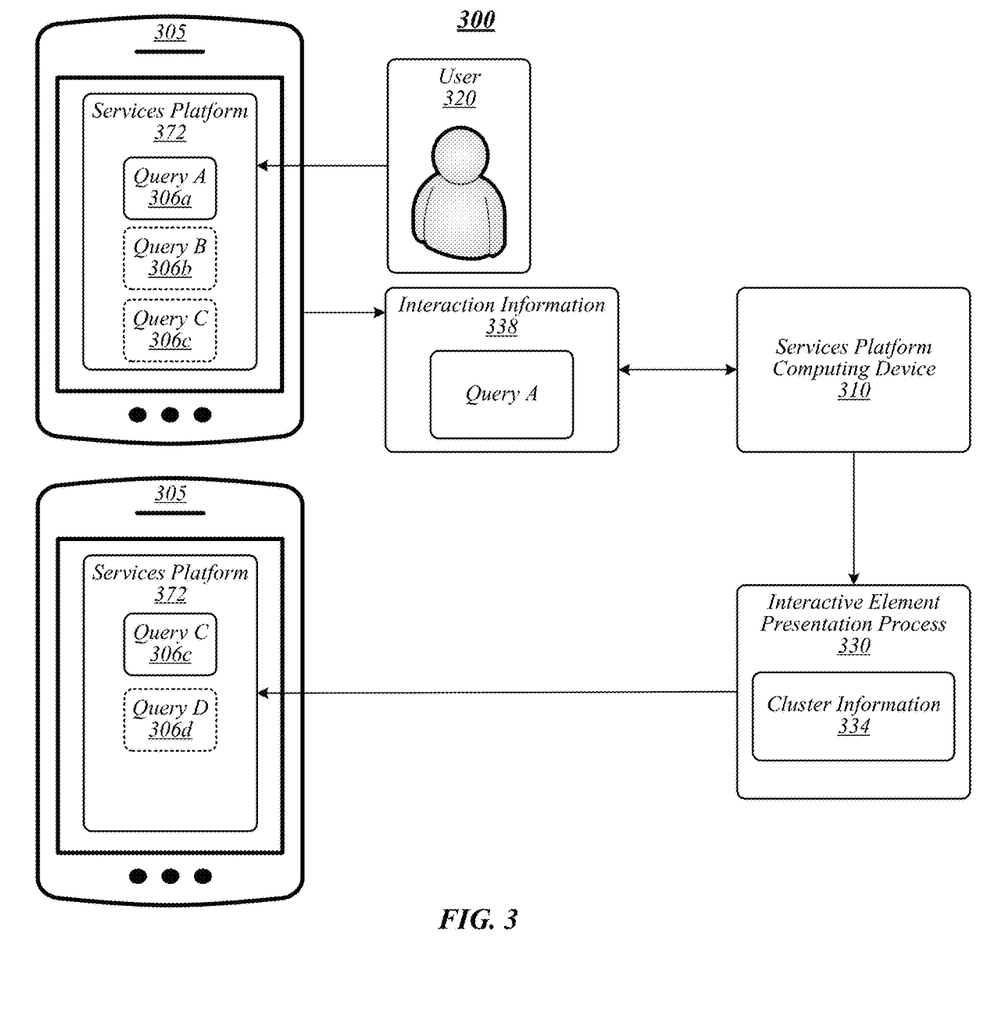
FIG. 3 illustrates an embodiment of a third operating environment.

FIG. 3 illustrates an example of an operating environment 300 that may be representative of some embodiments. As shown in FIG. 3, a user 320 may open a services platform 372 on a computing device 305. For example, user 320 may initiate a credit card application transaction via services platform 372, which may initiate a corresponding form. In some embodiments, a set of interactive elements 306a-c may be determined based on one or more clusters associated with user 320. For example, interactive elements 306a-c may include queries for requesting information from user 302 to complete the credit card application, such as personal information, credit score, and/or the like. Initially, Query A 306a is presented to user 320 (Query B 306b and Query C 306c are not visible as indicated by the dashed lines). For example, Query A 306a may have a highest priority, followed by Query B 306b and Query C 306c. Although only one interactive element 306 is depicted as being visible in FIG. 3, embodiments are not so limited, as a plurality of interactive elements may be depicted at any given time. In some embodiments, interaction information 338 may include which interactive element 306 was selected when multiple interactive elements were displayed simultaneously.

User 320 may interact with services platform 372, generating interaction information 338 for Query A 306a. Interaction information 338 may indicate whether user 320 engaged with Query A and the nature of the engagement. For example, interaction information 338 may indicate that user 320 did not answer the question presented via Query A for a duration (for instance, two minutes). In another example, interaction information 338 may indicate that user 320 answered the question presented via Query A incorrectly. In a further example, interaction information 338 may indicate that user 320 answered the question presented via Query A correctly (for instance, by entering certain personal information). In an additional example, interaction information 338 may indicate that user 320 made a certain selection of Query A (for instance, selecting "Yes" for a Yes/No query).

Interaction information 338 may be provided to the services platform, for example, via computing device 310, which may initiate an interactive element presentation process 330. In some embodiments, interactive element presentation process 330 may analyze interaction information 338 based on cluster information 334, for example, based on a cluster associated with user, and modify the set of interactive elements 306 based on the interaction information. For example, as shown in FIG. 3, Query B 306b may have been removed from the set, Query C 306c prioritized, and Query D 306d added to the set. For example, the interactive element 306 with the lowest priority may be removed, and the interactive element with the highest priority value of the interactive elements not already in the set may be added. User interaction with Query B 306b may cause a similar round of generating interaction information 338 and dynamically changing the set of interactive elements 306 via interactive element presentation process 330.

In this manner, interactive element presentation processes according to some embodiments may operate to increase user activity with a services platform and minimize user disengagement. For example, Cluster A users engaged in a transaction may only be willing to answer x number of questions (for instance, 3), while Cluster B users may answer x+n (for instance, 5). Accordingly, interactive element presentation processes may determine which cluster a user belongs to and present them with a set of interactive elements that matches the behavior of the associated cluster. Accordingly, for a user in Cluster A, give them x questions and prioritize the questions to give them the higher-ranked questions first. For a user in Cluster B, plan on giving them x+n questions, which may also be prioritized. If there is a detection of less/more engagement (for instance, based on typing speed, eye movement, time between responses, and/or the like), dynamically modify the set of interactive elements and/or the sequence thereof. For example, for a user in Cluster A, the number of questions may be increased to x+t if higher than normal engagement is detected (for instance, a high rate of answering questions than typical for cluster members). In some embodiments, interactive element presentation process 330 may attempt to maximize the number of interactive elements 306 presented to a user (either at one time or sequentially).

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 4:
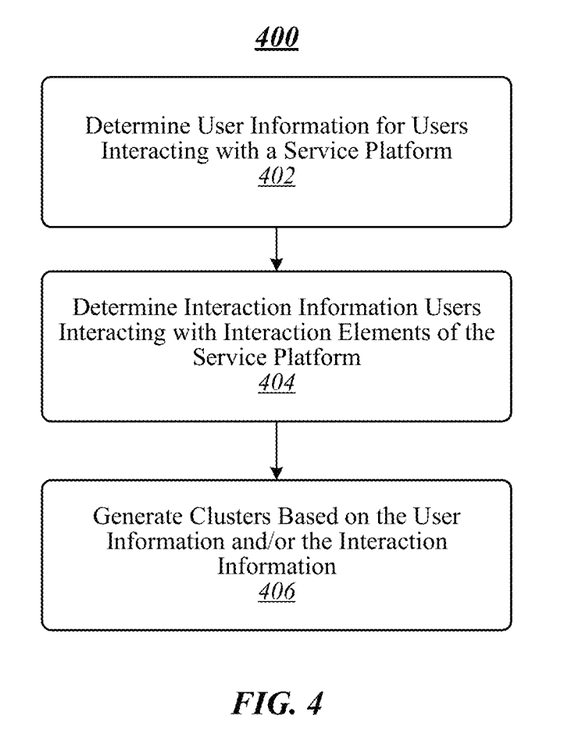
FIG. 4 illustrates an embodiment of a first logic flow.

FIG. 4 illustrates an embodiment of a logic flow 400. Logic flow 400 may be representative of some or all of the operations executed by one or more embodiments described herein, such as computing device 110 and/or computing device 310. Logic flow 400 may be representative of some or all of the operations of a process for generating user clusters according to some embodiments.

At block 402, logic flow 400 may determine user information for users interacting with a service platform. For example, cluster profile logic 124 may determine cluster characteristics 204a-n associated with users of services platform 172. Logic flow 400 may determine interaction information for users interacting with interactive elements of the services platform. For example, cluster profile logic 124 may determine interaction information 138 for users interacting with interactive elements 174a-n of services platform 172. In some embodiments, cluster profile logic 124 may maintain historical information of user interaction information 138, including interaction information 138 determined via testing, such as AB testing of services platform elements. At block 406, logic flow 400 may generate clusters based on the user information and/or the interaction information. For example, cluster profile logic 124 may generate clusters 202a-n based on various cluster characteristics 204a-n.

In general, clusters may be determined in any manner that may be used to determine, measure, or otherwise manage user engagement. For example, services platform logic 122 may determine that certain clusters are more effective at increasing user engagement. For example, services platform logic 122 may maintain effectiveness information, such as levels of engagement (for instance, frequency of engagement, duration of engagement, purchase amounts, transaction levels, rate of transaction completion, and/or the like). For example, clustering users based on income range may be less effective than clustering users based on device type. In addition, combinations of cluster characteristics may be determined to be more effective. For example, a cluster based on device type and education level may be more effective at increasing engagement than device type alone. For example, associating User A with Cluster A may lead to a higher rate of services platform visits, while associating User A with Cluster B may lead to a lower rate of visits, but more transaction completions. Embodiments are not limited in this context.

Figure 5:
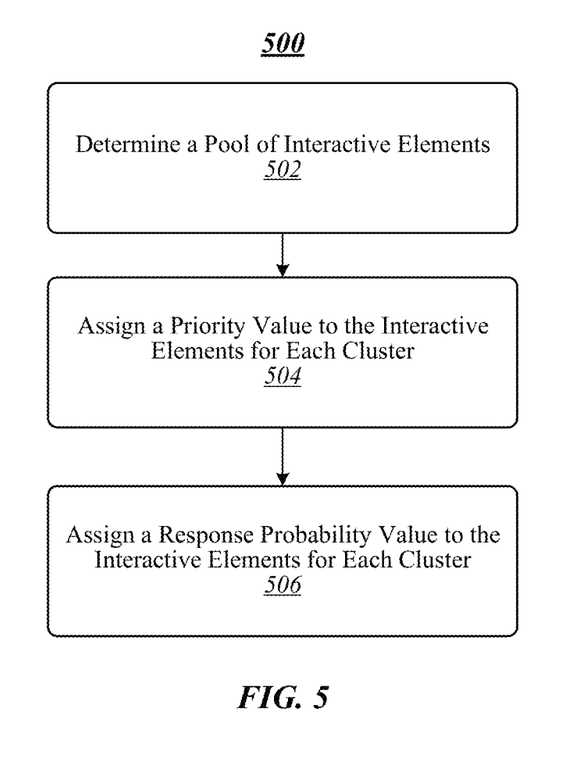
FIG. 5 illustrates an embodiment of a second logic flow.

FIG. 5 illustrates an embodiment of a logic flow 500. Logic flow 500 may be representative of some or all of the operations executed by one or more embodiments described herein, such as computing device 110 and/or computing device 310. Logic flow 500 may be representative of some or all of the operations of a process for generating user clusters according to some embodiments.

At block 502, logic flow 500 may determine a pool of interactive elements. For example, interactive element logic 126 may maintain a database or other data structure of interactive elements available for use on services platform 172. In some embodiments, interactive elements may be transaction specific. For example, if a user initiates a purchase transaction, a population of potential interactive elements may be associated with purchases (for instance, personal information queries, payment queries, shipping information queries, checkout GUI objects, shopping cart GUI objects, and/or the like). Certain of the interactive elements may be required (for instance, shipping information, payment information, and/or the like), and certain interactive elements may be optional (for example, product suggestions, re-entry of information for security purposes, such as re-entry of a password to complete transaction for a logged-in user, and/or the like).

Logic flow 500 may assign a priority value to the interactive elements for each cluster at block 504. For example, each interactive element may be associated with a priority indicating a precedence for display to the user. In some embodiments, an interactive element may include a plurality of priorities, including a priority for a particular cluster and/or a context. For instance, Query A may have a priority of 8/10 for Cluster A and a priority of 5/10 for Cluster B. In another instance, Query A may have a priority of 8/10 for Cluster A in a first context (for instance, in motion, particular device, engagement score) and a priority of 5/10 for Cluster A in a second context). In another instance, the priority may be changed based on user interaction with a previously-presented interactive element. For example, if a user answered Query A, then the priority of Query B may be lowered.

At block 506, logic flow 500 may assign a response probability value to the interactive elements for each cluster. For example, each interactive element may be associated with a response probability value indicating a probability that a user associated with a cluster will engage the interactive element (for example, answer a query). In some embodiments, the response probability may be based on testing (for instance, AB testing, outlier detection, Z-score, and/or the like) and/or historical information. In various embodiments, the response probability value may be changed based on user interaction with a previously-presented interactive element. For example, the probability of a user answering Query C may increase/decrease responsive to the user answering Query A and Query B. In various embodiments, the response probability value may be changed based on context information. For example, the probability of a user answering Query A may increase/decrease based on the time of day, type of device, and/or the like.

Figure 6:
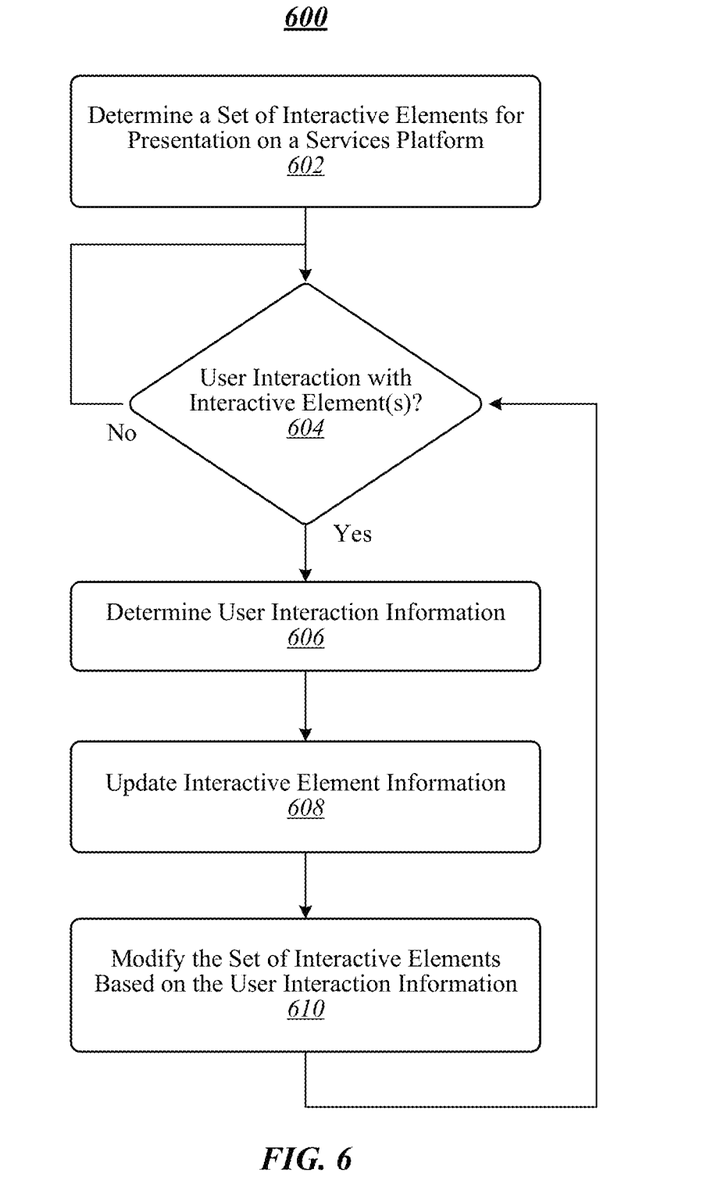
FIG. 6 illustrates an embodiment of a third logic flow.

FIG. 6 illustrates an embodiment of a logic flow 600. Logic flow 600 may be representative of some or all of the operations executed by one or more embodiments described herein, such as computing device 110 and/or computing device 310. Logic flow 600 may be representative of some or all of the operations of an interactive element presentation process according to some embodiments.

At block 602, logic flow 600 may determine a set of interactive elements for presentation on a services platform. For example, services logic 122 may determine a type of transaction and a pool of interactive elements 174*a-n* (for instance, queries) associated with the transaction. Interactive element logic 126 may present a set of queries selected from the pool of queries based on a priority value and/or a response probability value for the cluster associated with the user.

Logic flow 600 may determine whether there has been user interaction with the interactive elements at block 604. For example, user interaction may include selecting a GUI button, entering text, selecting a GUI radio button, and/or the like. In some embodiments, the user interaction may include a non-response such as not responding during a time period, closing the app, and/or the like. At block 606, logic flow 600 may determine user interaction information. For example, services platform logic 122 may determine information associated with user interaction with interactive element 174*a-n*, including the nature of the interaction (for instance, selection, entering text, lack of a selection, and/or the like), response time, engagement score, other interactive elements being displayed, and/or the like.

At block 608, logic flow 600 may update interactive element information. For example, services platform logic 122 may add the information for the interaction to the cluster information 134 and/or interaction information 138 as historical information that may be used for determining clusters, priorities, response probabilities, and/or the like.

Logic flow 600 may modify the set of interactive elements based on the user interaction information at block 610. For example, interaction information 338 may be provided to the services platform, for example, via computing device 310, which may initiate an interactive element presentation process 330. In some embodiments, interactive element presentation process 330 may analyze interaction information 338 based on cluster information 334, for example, based on a cluster associated with user, and modify the set of interactive elements 306 based on the interaction information. For example, as shown in FIG. 3, Query B 306*b* may have been removed from the set, Query C 306*c* prioritized, and Query D 306*d* added to the set. User interaction with Query B 306*b* may cause a similar round of generating interaction information 338 and dynamically changing the set of interactive elements 306 via interactive element presentation process 330.

Figure 7:
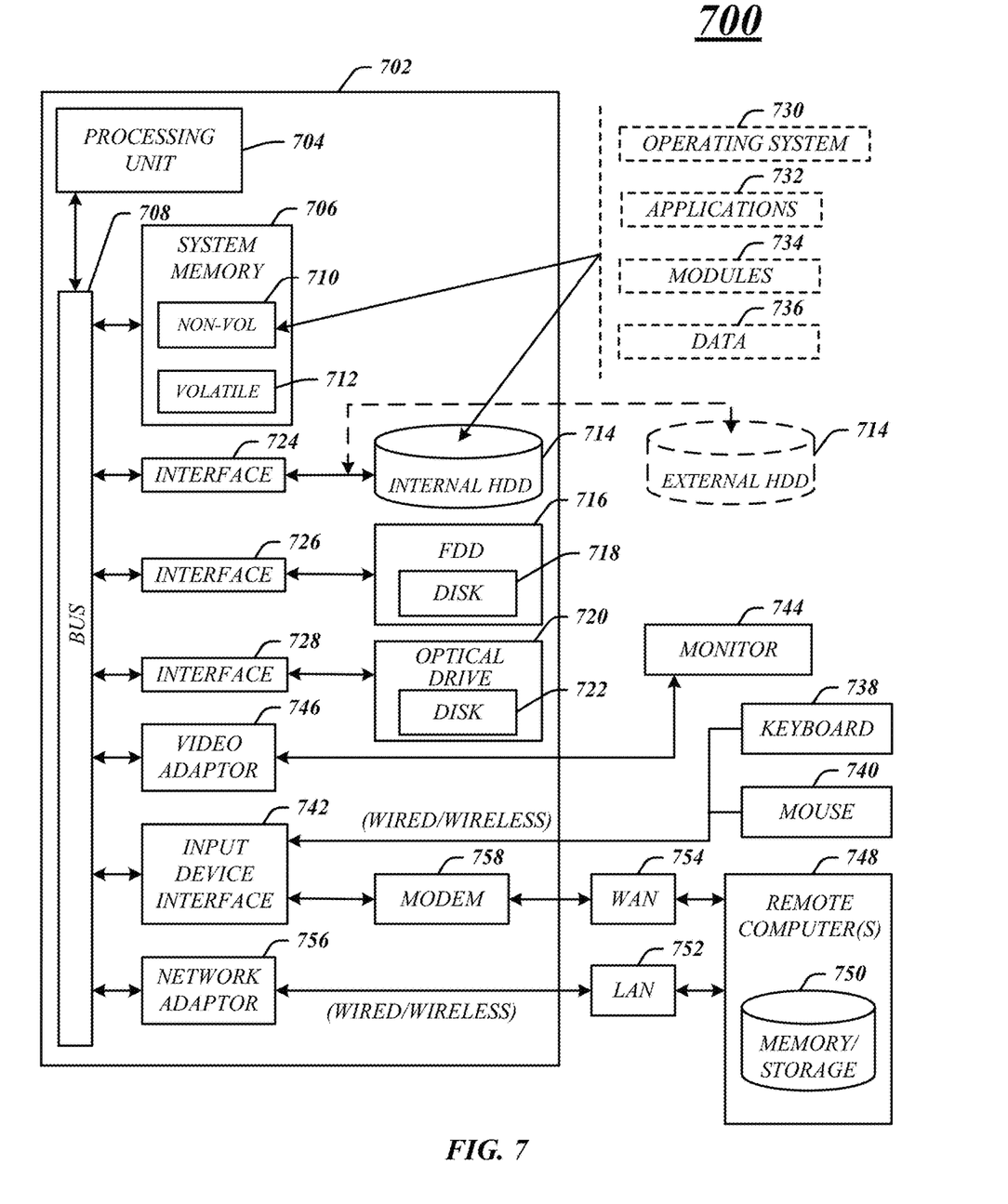
FIG. 7 illustrates an embodiment of a computing architecture.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of computing devices 110 and/or 310. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of computing device 110

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a storage device; and
logic, at least a portion of the logic implemented in circuitry coupled to the storage device, the logic to:
determine a plurality of user clusters to categorize a plurality of users based on an interaction level with a computer-implemented platform, each of the plurality of user clusters determined based on at least one cluster characteristic with a context of interaction, the context of interaction associated with an engagement level and at least one of time of day, device type, or duration between visits,
determine the context of interaction for at least one of the plurality of users interacting with the computer-implemented platform,
determine a plurality of queries to prompt for user information from the plurality of users,
assign each of the plurality of queries:
a plurality of priority values, each of the plurality of priority values indicating a priority of a query for one of the plurality of user clusters, and
a plurality of response probability values, each of the plurality of response probability values comprising a second value indicating a probability that a user of the one of the plurality of user clusters interacts with the query, each of the plurality of response probability values determined based at least partially on the context of interaction,
present a set of user queries selected from the plurality of queries for presentation to the one of the plurality of users interacting with the computer-implemented interface based on the plurality of priority values and the plurality of response probability values for the one of the plurality of user clusters associated with the one of the plurality of users,
receive interaction information associated with user interaction with the computer-implemented platform during presentation of the set of user queries, and
modify the set of user queries based on the interaction information.

2. The apparatus of claim 1, the logic to modify the set of user queries by dynamically removing at least one unanswered query responsive to the interaction information indicating decreased engagement with the computer-implemented platform.

3. The apparatus of claim 2, the logic to remove the at least one unanswered query with a lowest priority value.

4. The apparatus of claim 1, the logic to modify the set of user queries by dynamically adding at least one query responsive to the interaction information indicating increased engagement with the computer-implemented platform.

5. The apparatus of claim 4, the logic to add the at least one query responsive with a highest priority value of remaining queries of the plurality of queries.

6. The apparatus of claim 1, the logic to generate the plurality of user clusters based on user profile information and query interaction information, the query interaction information to indicate at least one of the set of user queries answered by the one of the plurality of users.

7. The apparatus of claim 1, the logic to determine the set of user queries to include a maximum number of queries expected to be answered by the one of the plurality of users.

8. The apparatus of claim 1, the logic to:
determine effectiveness information for each of the plurality of user clusters, the effectiveness information to indicate a level of engagement comprising at least one of a frequency of computer-implemented platform visits, a duration of engagement, a purchase amount, or transaction completions; and determine at least one of the plurality of user clusters comprising a combination of cluster characteristics based on the effectiveness information.

9. A computer-implemented method, comprising, via a processor of a computing device:

determining a plurality of user clusters to categorize a plurality of users based on an interaction level with a computer-implemented platform, each of the plurality of user clusters determined based on at least one cluster characteristic with a context of interaction, the context of interaction associated with an engagement level and at least one of time of day, device type, or duration between visits;

determining the context of interaction for at least one of the plurality of users interacting with the computer-implemented platform;

determining a plurality of queries to prompt for user information from the plurality of users;

assigning each of the plurality of queries:
a plurality of priority values, each of the plurality of priority values indicating a priority of a query for one of the plurality of user clusters, and
a plurality of response probability values, each of the plurality of response probability values comprising a second value indicating a probability that a user of the one of the plurality of user clusters interacts with the query, each of the plurality of response probability values determined based at least partially on the context of interaction;

presenting a set of user queries selected from the plurality of queries for presentation to the one of the plurality of users interacting with a computer-implemented interface based on the plurality of priority values and the plurality of response probability values for the one of the plurality of user clusters associated with the one of the plurality of users;

receiving interaction information associated with user interaction with the computer-implemented platform during presentation of the set of user queries; and modifying the set of user queries based on the interaction information.

10. The computer-implemented method of claim 9, comprising modifying the set of user queries by dynamically removing at least one unanswered query responsive to the interaction information indicating decreased engagement with the computer-implemented platform.

11. The computer-implemented method of claim 10, comprising removing the at least one unanswered query with a lowest priority value.

12. The computer-implemented method of claim 9, comprising modifying the set of user queries by dynamically adding at least one query responsive to the interaction information indicating increased engagement with the computer-implemented platform.

13. The computer-implemented method of claim 12, comprising adding the at least one query responsive with a highest priority value of remaining queries of the plurality of queries.

14. The computer-implemented method of claim 9, comprising generating the plurality of user clusters based on user profile information and query interaction information, the query interaction information to indicate at least one of the set of user queries answered by the one of the plurality of users.

15. The computer-implemented method of claim 9, comprising determining the set of user queries to include a maximum number of queries expected to be answered by the one of the plurality of users.

16. The method of claim 9, comprising:

determining effectiveness information for each of the plurality of user clusters, the effectiveness information to indicate a level of engagement comprising at least one of a frequency of computer-implemented platform visits, a duration of engagement, a purchase amount, or transaction completions; and determining at least one of the plurality of user clusters comprising a combination of cluster characteristics based on the effectiveness information.

17. At least one non-transitory computer-readable medium comprising a set of instructions that, in response to being executed via a processing unit of a computing device, cause the computing device to:

determine a plurality of user clusters to categorize a plurality of users based on an interaction level with a computer-implemented platform, each of the plurality of user clusters determined based on at least one cluster characteristic with a context of interaction, the context of interaction associated with an engagement level and at least one of time of day, device type, or duration between visits;

determine the context of interaction for at least one of the plurality of users interacting with the computer-implemented platform;

determine a plurality of queries to prompt for user information from the plurality of users;

assign each of the plurality of queries:
a plurality of priority values, each of the plurality of priority values indicating a priority of a query for one of the plurality of user clusters, and
a plurality of response probability values, each of the plurality of response probability values comprising a second value indicating a probability that a user of the one of the plurality of user clusters interacts with the query, each of the plurality of response probability values determined based at least partially on the context of interaction;

present a set of user queries selected from the plurality of queries for presentation to the one of the plurality of users interacting with a computer-implemented interface based on the plurality of priority values and the plurality of response probability values for the one of the plurality of user clusters associated with the one of the plurality of users;

receive interaction information associated with user interaction with the computer-implemented platform during presentation of the set of user queries; and modify the set of user queries based on the interaction information.

18. The at least one non-transitory computer-readable medium of claim 17, the set of instructions, in response to being executed via the processing unit of the computing device, to cause the computing device to:

modify the set of user queries by:
dynamically removing at least one unanswered query responsive to the interaction information indicating decreased engagement with the computer-implemented platform, and dynamically adding at least one query responsive to the interaction information indicating increased engagement with the computer-implemented platform.

19. The at least one non-transitory computer-readable medium of claim 17, the set of instructions, in response to being executed via the processing unit of the computing device, to cause the computing device to:
- determine effectiveness information for each of the plurality of user clusters, the effectiveness information to indicate a level of engagement comprising at least one of a frequency of computer-implemented platform visits, a duration of engagement, a purchase amount, or transaction completions; and
- determine at least one of the plurality of user clusters comprising a combination of cluster characteristics based on the effectiveness information.

\* \* \* \* \*